United States Patent [19]

Simons

[11] Patent Number: 4,630,985
[45] Date of Patent: Dec. 23, 1986

[54] SELF ALIGNING SCREW

[76] Inventor: Leon Simons, 303 E. 57th St., Apt. 47-E, New York, N.Y. 10022

[21] Appl. No.: 570,104

[22] Filed: Jan. 12, 1984

[51] Int. Cl.$^4$ ............................................. F16B 25/00
[52] U.S. Cl. ................... 411/386; 411/412; 411/417
[58] Field of Search ............... 411/16, 17, 393, 386, 411/387, 339, 323, 305, 306, 411–423; 10/140, 141 R; 408/113, 201, 213

[56] References Cited

U.S. PATENT DOCUMENTS

| | | | |
|---|---|---|---|
| 1,203,546 | 10/1916 | Parsons | 411/411 |
| 2,167,910 | 8/1939 | Rottenburg | 411/386 |
| 2,564,029 | 8/1951 | Peterson | 411/386 |
| 3,438,299 | 4/1969 | Gutshall | 411/387 |
| 4,069,730 | 1/1978 | Gutshall | 411/417 |
| 4,439,077 | 3/1984 | Godsted | 411/412 |

FOREIGN PATENT DOCUMENTS 1105703  3/1968  United Kingdom ............... 411/387

Primary Examiner—Gary L. Smith
Assistant Examiner—Neill Wilson
Attorney, Agent, or Firm—Blum Kaplan Friedman Silberman & Beran

[57] ABSTRACT

The screw has a conventional threaded body, and a tapered leading end for easy entry to a tapped hole. A projection extends radially from the tapered end portion and when the longitudinal center lines of the screw and hole are misaligned, makes first contact with the threads on the tapped hole. As the screw is turned, the projection follows the tapped threads of the hole to bring the machine screw into alignment. When the projection tracks the internal hole threads, the positional relationship between the projection and the first screw thread brings the starting point of the first screw thread into contact with the starting point of the first thread at the entrance of the tapped hole.

9 Claims, 7 Drawing Figures

SELF ALIGNING SCREW

BACKGROUND OF THE INVENTION

This invention relates generally to a fastener of the screw type used in conventional applications to hold structural elements or components in position relative to each other and more particularly, to a self-aligning threaded screw which reduces the danger of cross-threading when the screw is inserted into a mating tapped hole or threaded nut. Generally, there is no difficulty in starting a threaded machine screw in a tapped hole or nut when the two mating parts meet with the longitudinal axes in alignment. However, when the screw meets the entrance to the tapped hole with a mis-alignment between the longitudinal axes, the person directing the screw begins a process, perhaps even subconsciously, of "jiggling" the screw to start the threading process. A grossly mis-aligned screw quickly informs the person of the unacceptable condition and adjustment is made. However, a slight mis-alignment can easily allow the start of an engagement between the threads which results in cross-threading, wherein the threads on the screw or in the tapped hole or both are damaged. In severe cases, the hole may need retapping and the screw may have to be discarded. Thus, losses, especially in mass production with highly repetitive operations, can be worthy of attention both in terms of lost time and direct material costs.

What is needed is a screw fastener which performs the conventional functions of such machine type fasteners and minimizes or eliminates the loss and waste associated with mis-alignment and cross-threading.

SUMMARY OF THE INVENTION

Generally speaking, in accordance with the invention, a screw fastener especially suitable for overcoming the problems associated with mis-alignment and cross-threading between screw and tapped hole at the initiation of engagement is provided. The machine screw has a conventional straight threaded body and a leading end, that is, the end away from the screw head, which is tapered. The tapered end is rounded or conical or may be of many other concave and convex contours such that the leading end of the machine screw has lesser diametrical dimensions than the threaded body. Therefore, the tapered end of the machine screw easily enters a tapped hole.

A projection extends radially from the tapered end portion of the machine screw such that when the longitudinal center lines of the screw and hole are mis-aligned, the projection tends to make first contact with the threads on the tapped hole. As the screw is turned, the projection follows the tapped threads of the hole acting on the thread surfaces to bring the machine screw into alignment. Continued turning of the screw leads the screw thread and hole entrance into contact which results in an aligned threaded, insertion of the screw in the hole. The positional relationship between the projection and the first screw thread brings the starting point of the first screw thread into contact with the starting point of the first thread at the entrance of the tapped hole when the projection tracks the internal hole threads.

Accordingly, it is an object of this invention to provide an improved screw fastener which performs the conventional functions of screw type fasteners and is self-aligning.

Another object of this invention is to provide an improved screw fastener which eliminates the dangers of cross-threading.

A further object of this invention is to provide an improved screw fastener which improves assembly line efficiency.

Still other objects and advantages of this invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

With reference to the Figures, the self-aligning screw 10 or bolt in accordance with the invention includes a conventional body 12 of extended length having conventional threads 14 spiralled therearound in the conventional manner. The threads 14 extend along the length of the body 12 for varying distances depending upon the type of bolt and its application in the known manner. The profile of the threads 14 may be of any type suitable to the application and do not constitute a novel portion of this invention. Accordingly, the description herein of the threads is detailed only to the extent necessary to describe the novel features of the invention.

Further, in the Figures, the threads are not drawn to any scale and no particular thread standard is represented as all types of threaded bolts can be adapted to include the construction in accordance with the invention disclosed herein. Thus, in the Figures the conventional threads are shown, for example, in FIG. 5 with pointed roots and crests whereas in many standard threads the roots and crests are flattened or rounded in fabrication so as to provide a degree of clearance at these locations. Such clearances are not shown in the Figures herein since the conventionally threaded portions of the screw, as stated, are not a novel portion of this invention.

Figure 1:
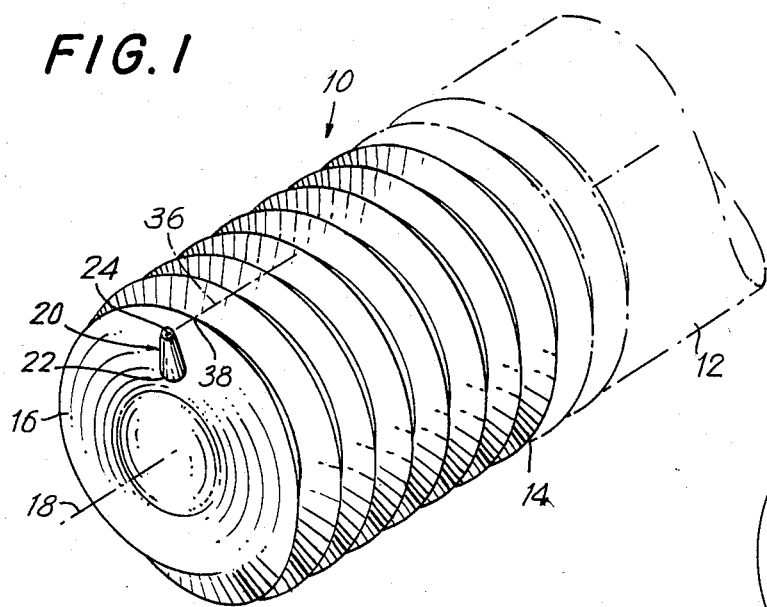
FIG. 1 is a partial perspective view of the leading end of a self-aligning screw in accordance with the invention.
Figure 2:
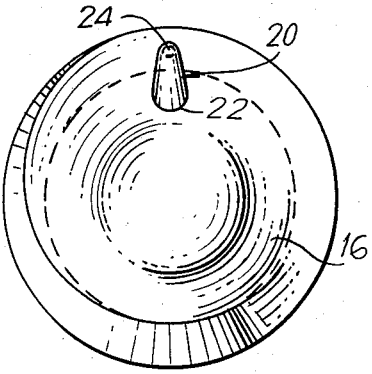
FIG. 2 is an end view of the screw fastener of FIG. 1.

The leading end of the threaded portion of the body 12 FIGS. 1 and 2 includes a rounded surface 16 which tapers inwardly toward the longitudinal center line axis 18 of the screw 10. A projection 20 extends from the rounded surface 16, generally in a radial direction toward the outermost circumference of the threaded portion of the screw body 12. The projection 20 is in the general shape of a truncated cone, being broad at the base 22 and thin and rounded at the tip 24, similar to the construction of old-fashioned phonograph needles. Projection 20 is integral with the rounded surface 16 at the leading end of the screw 10 to provide strength against shock and bending forces. It should be understood that the intersection of the projection 20 with the surface 16 may be filleted for additional strength. The radial height of the projection 20 as measured from the axis 18 is less than the height at the crest 26 of the threads 14. The base 22 of the projection 20 at its highest point 28 is closer to the axis 18 than is the root 30 of the threads 14.

Figure 5:
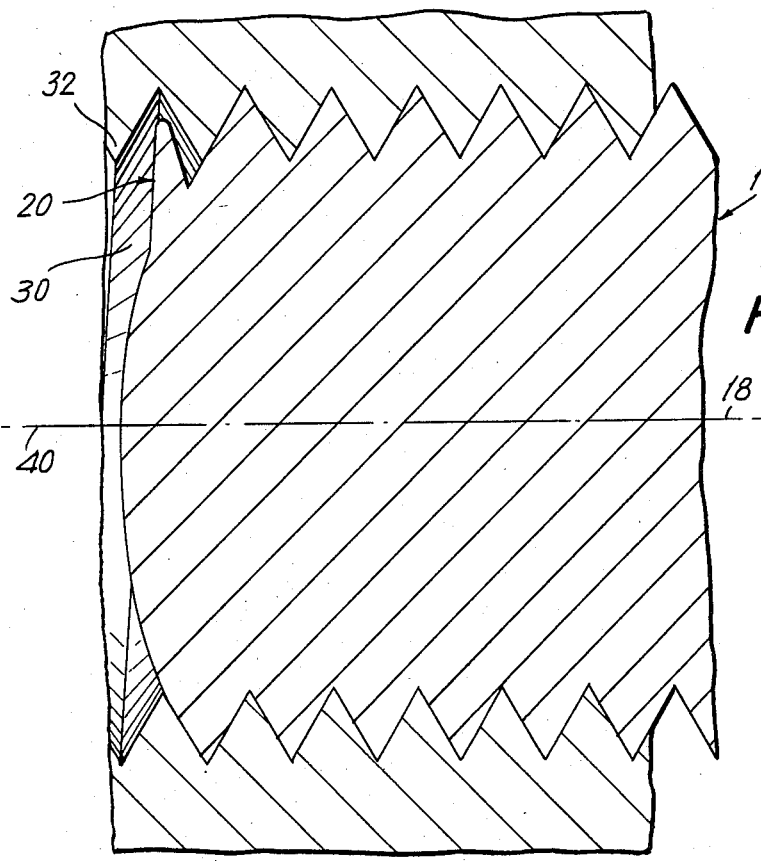
FIG. 5 illustrates the screw of FIGS. 3 and 4, seated in the tapped hole after a plurality of rotations.

Thus, when the screw 10 is seated in a tapped hole 30 having internal threads 32, the projection 20, as best illustrated in FIG. 5, is not in contact with the internal surfaces of the threads 32.

As illustrated (FIG. 3), the projection 20 has its tip 24 spaced a distance 34 away from the crest 26 of the first one of the threads 14 on the self-aligning screw 10, which distance 34 equals the pitch distance P of the threads 14. In other words, the projection 20 may be considered as the remnant of an additional thread at the leading edge of the screw 10 which has been almost entirely machined away leaving only the projection 20 and the curved surface 16.

Figure 4:
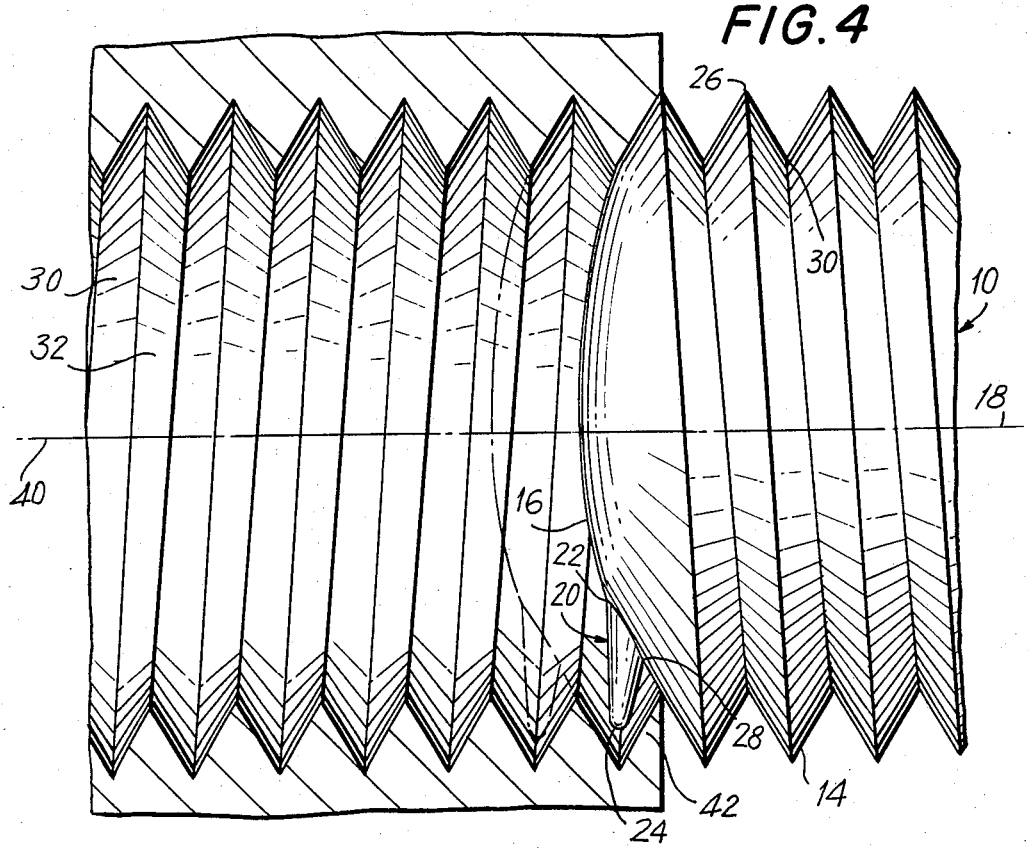
FIG. 4 is a view similar to FIG. 3 after the screw has been rotated 180°.

A line 36 (FIG. 1) from the tip 24 of the projection 20 parallel to the screw axis 18 intersects each thread at the starting point 38 of that thread. Thus, when the projection 20 has been threaded into the tapped hole 30 such that the projection 20 is cradled within the V-shaped cavity of the first internal thread, the starting point 38 of the first one of threads 14 on the self-aligning screw 10 will be adjacent to the exposed surface of the mating tapped hole at the starting point of the first internal thread thereof. This condition is illustrated in FIG. 4. Further turning of the screw 10 produces the normal threaded condition illustrated in FIG. 5.

As explained more fully hereinafter the distance 34 of the projection tip 24 from the crest 26 in the first thread is not limited to the pitch distance P of the threads 14.

FIGS. 4 and 5 illustrate conditions wherein the axis 18 of the screw 10 is in alignment, that is, coaxial with the axis 40 of the tapped hole 30. When the screw 10 approaches the hole 30 with center lines 18, 40 coaxial, the projection 20 may possibly make first contact with the outer surface of the tapped hole 30, especially at the inlet lip 42. But rotation of the screw 10 while in coaxial alignment quickly brings the projection 20 within the groove of the internal threads 32 as seen in FIG. 4, and further threading is in a completely conventional manner, the position after the next screw revolution being shown with broken lines in FIG. 4.

Figure 3:
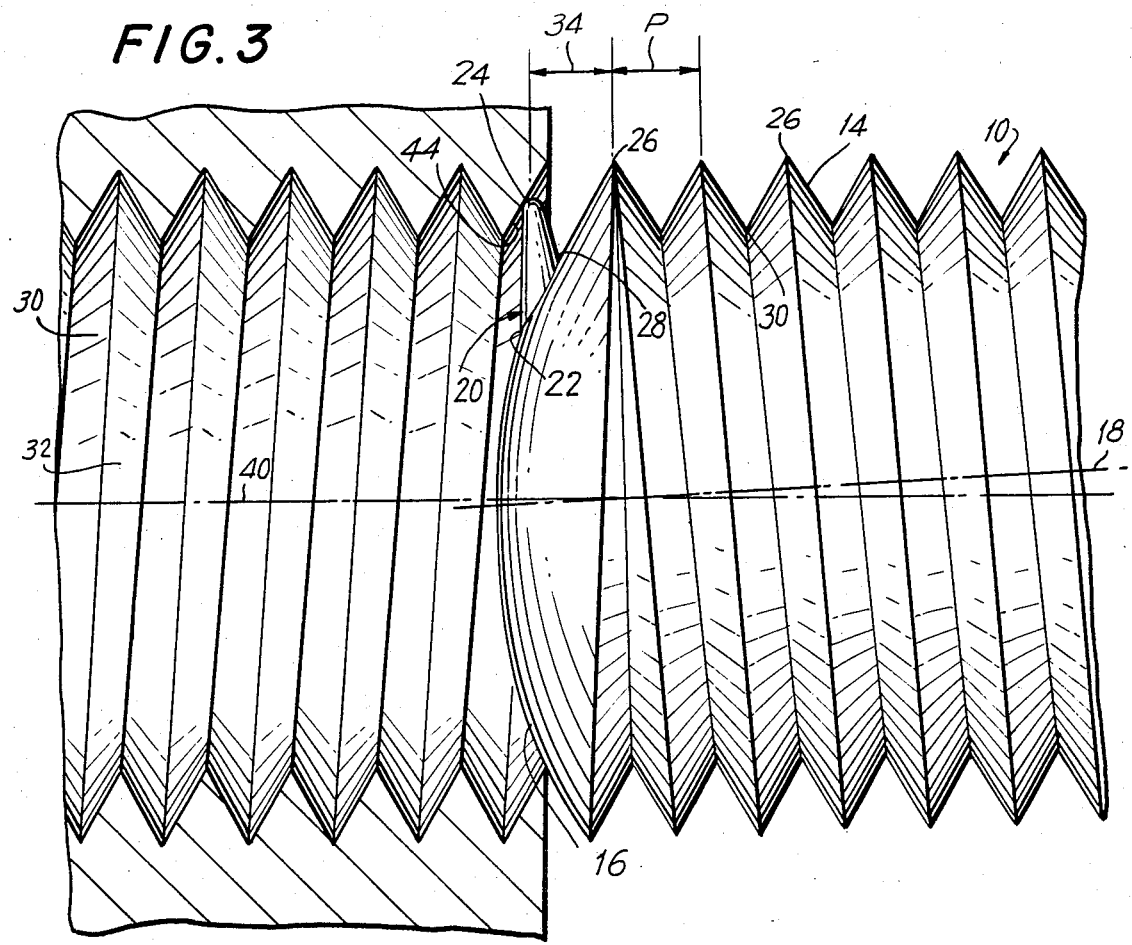
FIG. 3 illustrates mis-aligned entrance of the screw of FIG. 1 into a tapped hole.

On the other hand, when the screw 10 approaches the tapped hole 32 with a mis-alignment between the screw axis 18 and the hole axis 40 as illustrated, for example, in FIG. 3, the projection 20 in a favorable condition will strike against the first exposed sloped surface 44 at the entrance to the tapped hole 32. At that condition, no interengagement between the threads 14 and 32 is produced. As the screw 10 is rotated, as will be done in normal driving of the screw 10, the tip 24 of the projection rides along the surface 44 as the surface spirals its way continuously inward in the hole 30. In this way, the projection 20 rides on the surface somewhat as the aforementioned needle in the groove of a phonograph record until the condition illustrated in FIG. 3 results in the condition shown in FIG. 4 after turning the screw by 180°. Sliding the tip 24 of the projection 20 on the surface 44 brings the axes 18,40, originally mis-aligned, into alignment. Then, continued turning of the screw 10 threads the screw 10 into the hole 30 in the normal manner to produce the condition shown in FIG. 5.

Figure 6:
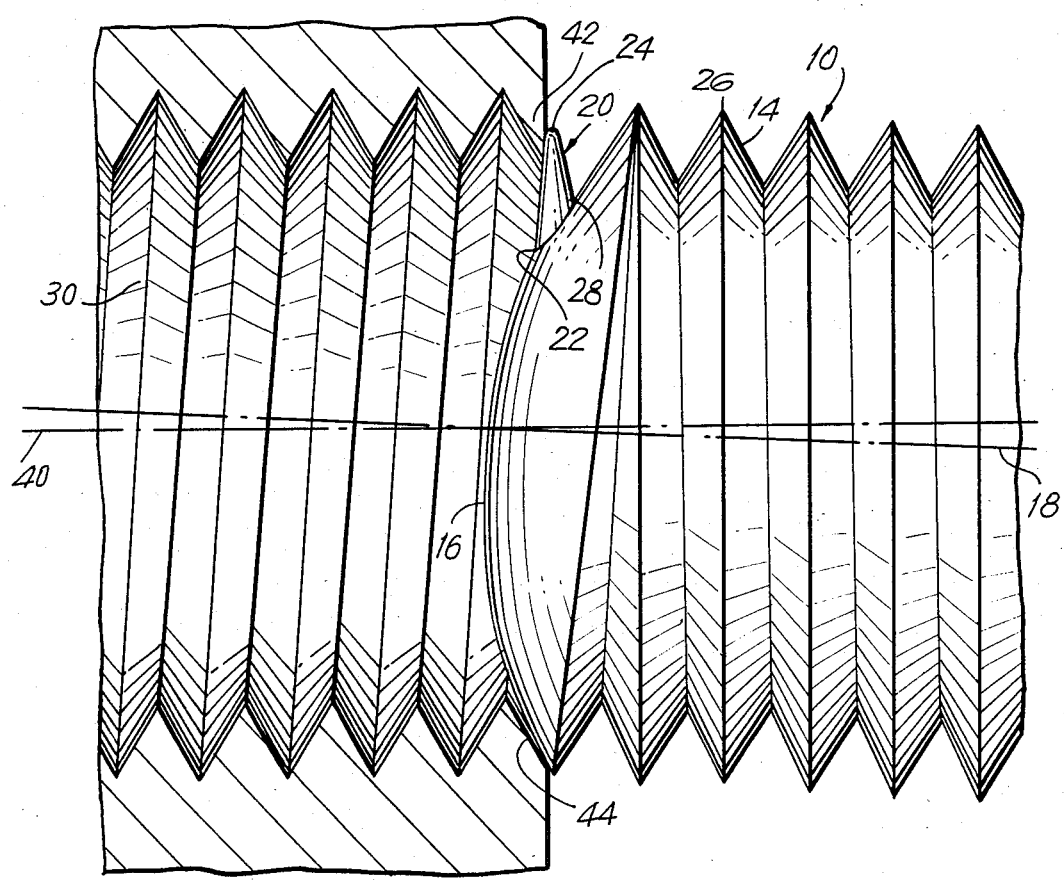
FIG. 6 is a view similar to FIG. 3 illustrating another condition of mis-alignment between the self-aligning screw of the instant invention and a tapped hole.

A worst case entrance condition occurs with mis-alignment when, upon initial contact between the screw 10 with the outer surface of the tapped hole 30, the projection 20 strikes the outside of the inlet lip 42 as illustrated in FIG. 6. However, conventional turning of the screw 10 causes the projection 20 to ride along the outer surface of the inlet hole 30, the lip 42 developing into the sloped surface 44. Thus, the projection finds its way into the first thread of the internally tapped hole 30 and further turning brings the mis-aligned axes 18, 40 into alignment as shown in FIG. 5.

In this manner, the screw 10 is brought into alignment with the internally tapped hole by the projection 20 before there is engagement between threads 14 of the screw 10 and threads 32 of the internally tapped hole 30. The shocks, if any, of mis-alignment are borne by the projection 20 and there is no mis-alignment or cross-threading between the threads 14, 32.

It should be understood that although a tapped hole is used in illustration, the self-aligning screw 10 operates in the same manner when engaging a threaded nut. In such a case, the projection 20 may extend beyond the boundaries of the nut after the screw and nut have been fully engaged.

As described above, the distance between the projection 20 and the starting point 38 of the first thread on the screw 10 is one thread pitch distance P and the projection 20 is longitudinally aligned with the starting point of the first thread. In other words, when the projection 20, by tracking on the internal thread surface 44 of the hole 30, brings the first thread 14 of the screw 10 into contact with the first thread 32 of the hole 30, this initial contact occurs at the thread starting point 38 where the first thread of the screw 10 begins engagement with the starting point of the first thread 32 of the hole 30. Thus, an alternative projection 20' (not shown) may be provided at any integral number of pitch distances P from the starting point 38 of the first thread 14 when longitudinally aligned to said starting point 38 as described above and illustrated in FIG. 1. Also, the projection may be ½ of the pitch distance P away from the first thread provided that the projection 20 is positioned circumferentially 180° away rotationally from the starting point 38 on the first thread 14 of the screw 10. An unlimited number of angular positions of the projection relative to the starting point 38 of the first thread are feasible provided that the distance 34 is correspondingly adjusted such that initial contact between the threads 14 and 32 occurs at the starting points of both threads whereby further turning of the screw provides engagement between them.

In alternative embodiments of a self-aligning screw in accordance with the invention, more than one projection may be provided on the rounded surface 16 so long as the conditions for the location of the projections relative to the starting point for the first thread 14 on the screw 10, as described above are satisfied by every projection.

Figure 7:
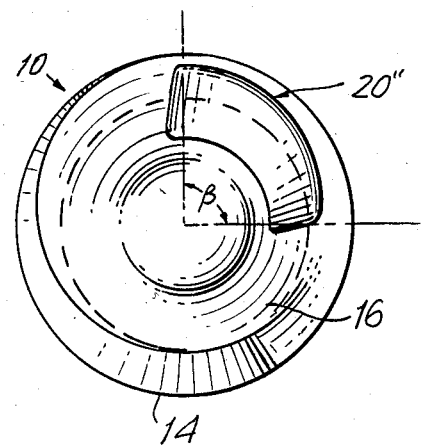
FIG. 7 is a view similar to FIG. 2 of an alternative embodiment of a self-aligning screw in accordance with the invention.

Also, in alternative embodiments (FIG. 7), the projection 20" rather than coming to a rounded point as illustrated in FIGS. 1 and 2, may be a ridge extending circumferentially around the surface 16 through an arc $\beta$. A relatively narrow arc $\beta$ provides the minimum hazard of cross-threading and thread damage in the tapped hole. However, a narrow arc represents a weaker construction for the projection than does a projection of greater arc. Angles $\beta$ in a range from 0°–180° may be used effectively. An arc of large magnitude may require that the crest of the ridge-like projection have spiralling curvature corresponding to the curvature of the threads in the tapped hole to avoid interference between the thread and the projection. Further, with reference to FIG. 5, the projection 20 may be contoured such that actual contact is made with at least some portions of the surfaces of the threads 32.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A self-aligning screw for use in a pre-threaded opening, the self-aligning screw comprising:
    a screw body of extended length, the screw body having a longitudinal axis in the body length direction;
    a screw thread spirally encircling at least a portion of the body, the screw thread adapted to engage a thread in a pre-threaded opening;
    a leading end on the screw body, the leading end extending in the lengthwise direction of the body and being adapted to precede the screw body into the pre-threaded opening; and
    a sole projection extending from the leading end of the screw body in a direction generally transverse to the axis, the projection being joined at a first end to the leading end of the screw body, the other end of the projection being free, the projection being positioned and contoured at the free end for nesting within the groove between adjacent threads of the pre-threaded opening when the screw thread and the thread of the pre-threaded opening are engaged, the projection comprising a conical segment having a rounded end, the projection being so positioned on the screw body relative to the start of the screw thread that, when the screw enters the pre-threaded opening, contact of the projection at any point along the outward-facing surface of the thread in the pre-threaded opening will serve to guide the screw thread into mating engagement with the thread of the pre-threaded opening as the screw and the pre-threaded opening are turned relative to one another.

2. A self-aligning screw for use in a pre-threaded opening, the self-aligning screw comprising:
    a screw body of extended length, the screw body having a longitudinal axis in the body length direction;
    a screw thread spirally encircling at least a portion of the body, the screw thread adapted to engage a thread in a pre-threaded opening;
    a leading end on the screw body, the leading end extending in the lengthwise direction of the body and being adapted to precede the screw body into the pre-threaded opening; and
    a projection extending from the leading end of the screw body in a direction generally transverse to the axis, the projection being joined at a first end to the leading end of the screw body, the other end of the projection being free, the projection being positioned and contoured at the free end for nesting within the groove between adjacent threads of the pre-threaded opening when the screw thread and the thread of the pre-threaded opening are engaged, the projection comprising a conical segment having a rounded end, the projection being so positioned on the screw body relative to the start of the screw thread that, when the screw enters the pre-threaded opening, contact of the projection at any point along the outward surface of the thread in the pre-threaded opening will serve to guide the screw thread into mating engagement with the thread of the pre-threaded opening as the screw and the pre-threaded opening are turned relative to one another.

3. A self-aligning screw comprising:
    a screw body of extended length and having a longitudinal axis in the body length direction and one end being adapted for first entry of said screw into a threaded opening;
    screw threads spirally encircling at least a portion of said body;
    a projection extending from said one end of said screw body in a direction generally transverse to said axis, said projection being joined at a first end to said one end of said screw body, the other end of said projection being free, said projection being positioned and contoured at said free end for nesting within the groove of the threads of said threaded opening when said screw threads and said threads of said threaded opening are concentrically engaged.

4. A self-aligning screw in accordance with claim 1, wherein the radial height of the sole transverse projection is less than the radial height of the screw thread.

5. A self-aligning screw in accordance with claim 4, wherein the sole projection is conical, having a rounded end.

6. A self-aligning screw in accordance with claim 1, wherein the sole transverse projection extends circumferentially about said leading end for less than 180°.

7. A self-aligning screw in accordance with claim 6, wherein the sole transverse projection has a crest whose curvature conforms to the curvature of the pre-threaded threads.

8. A self-aligning screw in accordance with claim 1, wherein the screw thread has a pre-determined pitch distance and wherein the sole projection is positioned an integral number of pitch distances from the starting point of the thread.

9. A self-aligning screw in accordance with claim 1, wherein the screw thread has a pre-determined pitch distance and wherein the sole projection is positioned on on the leading end by a fraction of the pitch distance, measured from the starting point of the thread, which is proportional to the angular displacement of said projection from the starting point of said screw thread.

* * * * *